United States Patent
DeNolf et al.

[19]

[11] Patent Number: 5,970,738
[45] Date of Patent: Oct. 26, 1999

[54] ACCUMULATOR OIL FILTER/ORIFICE HAVING AN EXTENDED TUBE

[75] Inventors: Steven J. DeNolf, Sylvania; John Fisk, Edon, both of Ohio; Jerry A. Tack, Troy, Mich.

[73] Assignee: Automotive Fluid Systems, Inc., Troy, Mich.

[21] Appl. No.: 08/970,404

[22] Filed: Nov. 14, 1997

Related U.S. Application Data

[63] Continuation of application No. 08/707,780, Sep. 16, 1996, abandoned
[60] Provisional application No. 60/003,984, Sep. 19, 1995.

[51] Int. Cl.⁶ .................................................. F25B 43/02
[52] U.S. Cl. .............................. 62/474; 62/503; 285/197
[58] Field of Search ............................... 62/503, 470, 471, 62/474; 55/403; 285/197

[56] References Cited

U.S. PATENT DOCUMENTS

| | | | |
|---|---|---|---|
| 1,908,821 | 5/1933 | Cornell, Jr. ............................... | 285/197 |
| 3,746,370 | 7/1973 | Aulisa ...................................... | 285/197 |
| 4,224,161 | 9/1980 | Anderson ................................. | 210/232 |
| 4,316,622 | 2/1982 | Nelson .................................... | 285/119 |
| 4,691,083 | 9/1987 | Dienes .................................... | 285/197 |
| 5,125,431 | 6/1992 | Vogel et al. ............................. | 285/197 |
| 5,199,145 | 4/1993 | McMillan et al. ....................... | 285/197 |

FOREIGN PATENT DOCUMENTS 1503343  3/1978  United Kingdom .

*Primary Examiner*—William E. Tapolcai
*Attorney, Agent, or Firm*—Vanophem Meehan & Vanophem, P.C.

[57] ABSTRACT

An improved oil filter unit for attachment to a bight portion of a "J" tube of an accumulator dehydrator includes a rigid, preferably metal pick-up tube or projection. The rigid projection prevents collapse of an extension of a disk held by the oil filter unit during assembly of the oil filter unit to the aperture in the "J" tube. The rigid projection also includes an extended lower end which extends closer to the bottom of the accumulator to allow less oil to be in the accumulator for lubricating the compressor of the air-conditioning system, thereby realizing a significant cost savings compared to prior art accumulators.

7 Claims, 2 Drawing Sheets

ACCUMULATOR OIL FILTER/ORIFICE HAVING AN EXTENDED TUBE

CROSS REFERENCE TO RELATED APPLICATION

This is a continuation of application Ser. No. 08/707,780 filed on Sep. 16, 1996, abandoned.

This application cross references and claims priority to application Ser. No. 60/003,984 filed Sep. 19, 1995.

BACKGROUND OF THE INVENTION

1. Field of the Invention

The present invention generally relates to accumulator filter units for use in automotive air-conditioning systems. More particularly, the present invention relates to a unique oil filter unit attached to an aperture in a bight portion of an outlet tube of an accumulator dehydrator.

2. Description of the Prior Art

Certain types of air conditioning systems require the use of an accumulator dehydrator as part of the air-conditioning system. The accumulator dehydrator is located just before the compressor and operates to ensure that no liquid refrigerant fluid is sent to the compressor which may cause slugging of the compressor. Accumulator dehydrators also commonly include some means for entraining oil in the gaseous refrigerant fluid sent to the compressor so the oil can lubricate the parts of the compressor. Typically, an oil filter is used in the accumulator for filtering debris from the oil prior to the oil being entrained in the gaseous refrigerant fluid returned to the compressor.

It is well known in the art to have the oil filter connected on an aperture in a conduit, such as an outlet tube of the accumulator dehydrator. However, various other types of oil filters and devices have been proposed for entraining oil in the gaseous refrigerant fluid returning to the compressor.

U.S. Pat. No. 4,316,622, to Nelson, incorporated herein by reference, discloses a conduit clamp assembly for maintaining a secure connection of an oil filter to a conduit by means of a compressive force clamp. The oil filter assembly is unitary with the clamp. However, the oil filter assembly disclosed in the Nelson reference has a flexible extension or nipple which is inserted into the aperture in the conduit as a passageway for the lubricating oil to be entrained in a gaseous refrigerant fluid flowing through the conduit. The extension or nipple of the oil filter assembly of the Nelson reference has a tendency to become crushed upon insertion into the apertured conduit and is unreliable. If this oil filter unit ceases to entrain oil in the gaseous refrigerant fluid, the compressor will not be lubricated and will operate inefficiently and eventually become inoperative, necessitating replacement and a complete repair of the air-conditioning system at significant expense.

U.S. Pat. No. 3,872,689, to Bottum, provides an oil filter element completely surrounding a bight portion of the outlet tube; the oil filter element covers an aperture located in the bight portion of the outlet tube. The filter is designed merely to filter fluid before it passes through the aperture. The '689 design requires a significant amount of oil in the system because of the design of the filter and location of the aperture thereby adding significantly to the overall cost of the accumulator.

U.S. Pat. Nos. 4,331,001, to Jones, and 4,509,340, to Mullally et al., disclose a pick-up tube that extends vertically from the bottom of an accumulator canister. A filter unit is attached to the inlet end of the pick-up tube located in the bottom of the accumulator. The pick-up tube of these references extends upward to an opening in an inlet end of an outlet tube located near the top of the accumulator canister. In order for the pick-up tube to reach the outlet tube located at the top of the accumulator, the pick-up tube must be made extremely long. The lengthy nature of these pick-up tubes requires the tubes be bent to pass a desiccant material and reach the inlet end of the outlet tube, which adds significantly to cost. In addition, a seal is required at the outlet tube opening to prevent any leaking of oil and liquid refrigerant. Most significantly, the design of the '001 and '340 references requires that a very high venturi pressure be created to entrain oil in the gaseous refrigerant fluid returned to the compressor. These configurations operate very poorly and add unnecessary cost and complexity to the accumulator assembly and will not work in some prior art air-conditioning systems.

Thus, there is still a need to improve upon the oil filter assembly for use in an accumulator of an air-conditioning system to provide a reliable connection to an apertured conduit for an oil filter assembly which is efficient in operation of the air-conditioning system, without adding unneccessary cost and complexity to the accumulator assembly.

SUMMARY OF THE INVENTION

The present invention resides in an oil filter connected to an outlet tube in an accumulator dehydrator assembly. The oil filter is attached to the outlet tube of the accumulator dehydrator assembly for entraining oil in the gaseous refrigerant fluid returning to the compressor of the air-conditioning system for lubricating the compressor.

The oil filter assembly includes a thermoplastic disk having an extension or nipple for insertion into a hole in the outlet tube. The extension or nipple of the disk has a passage therethrough and a pick-up tube made of a relatively hard material such as metal, alloy, or high strength plastic is inserted in the passage of the disk of the oil filter assembly for conveying the oil for lubricating the compressor of the air-conditioning system. The pick-up tube is extended whereby it reaches lower in the accumulator filter to use less oil in the system than known prior art oil filter assemblies resulting in a significant savings.

It is an object of the present invention to provide an improved oil filter unit for use in an air-conditioning system's accumulator dehydrator which will ensure reliability in use by ensuring the oil filter unit is properly connected to an aperture in an outlet tube.

It is a further object of the present invention to provide an oil filter unit having a nipple having a tube inserted therein for insertion into an aperture in an outlet tube to prevent oil from returning to the compressor.

It is a further object of the present invention to utilize an extended tube within the accumulator's oil filter to provide more efficient use of the lubricating oil within the air-conditioning system and to thereby reduce the overall cost of the accumulator dehydrator.

DETAILED DESCRIPTION OF THE PREFERRED EMBODIMENT

Figure 1:
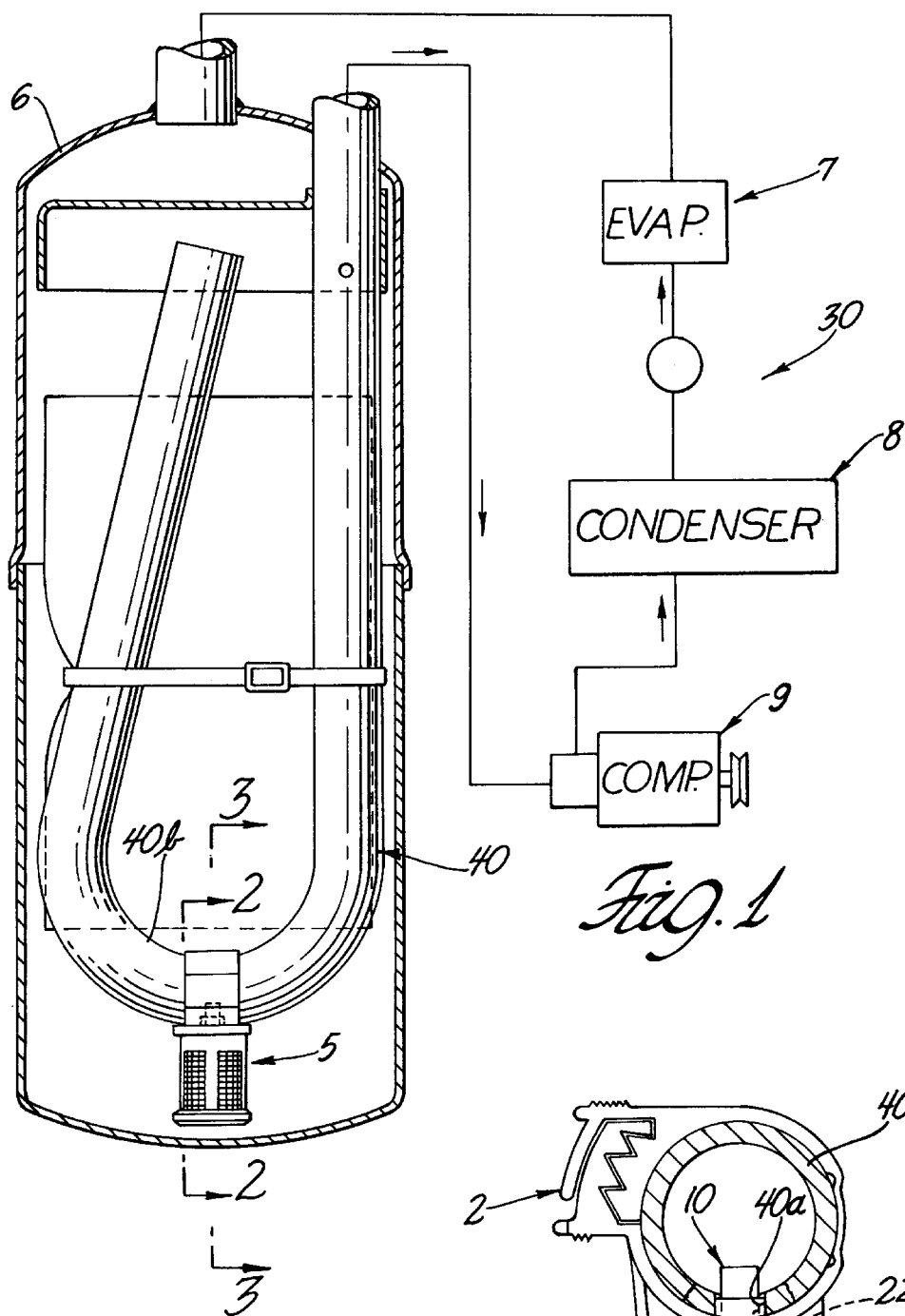
FIG. 1 is a schematic representation of a typical vehicular air-conditioning system in which an accumulator is detailed showing an oil filter assembly as positioned on the bight portion of a "J" shaped outlet tube according to the present invention.
Figure 2:
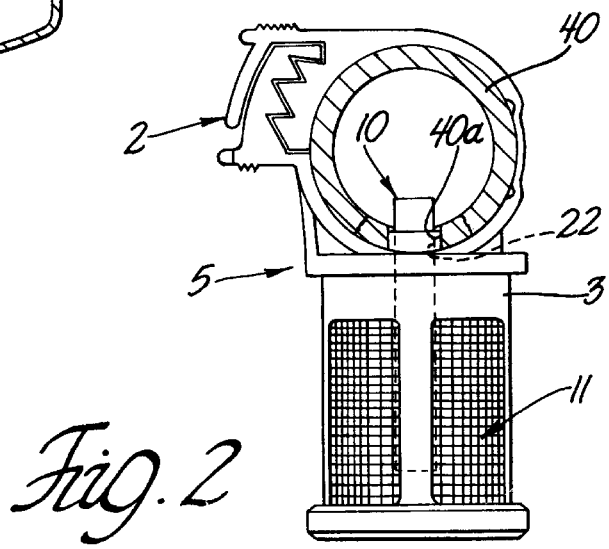
FIG. 2 is a partial cross-sectional side view of an oil filter assembly including a conduit clamp according to the present invention taken along line 2—2 of FIG. 1.

Referring generally to FIGS. 1 through 4, and in particular to FIG. 1, there is shown a conventional vehicular air-conditioning system 30 including a compressor 9, a condenser 8, an evaporator 7, and an accumulator dehydrator 6. The accumulator dehydrator 6 includes an outlet or "J" tube 40. The "J" tube 40 includes an aperture 40a in a bight portion 40b of the "J" tube 40. The aperture 40a is located on the bottom facing side of the bight portion 40b so it is possible to reduce the amount of oil in the system as more fully described below.

An oil filter unit 5 attaches to the bight portion 40b of the "J" tube 40 as more fully described below. The oil filter unit 5 is composed of an oil filter or a mesh material 1 for filtering particulates from the material, a clamp 2 connected to a frame 3, and a pick-up tube or rigid projection 10 received within a passage 22 of a disk member 20.

Figure 3:
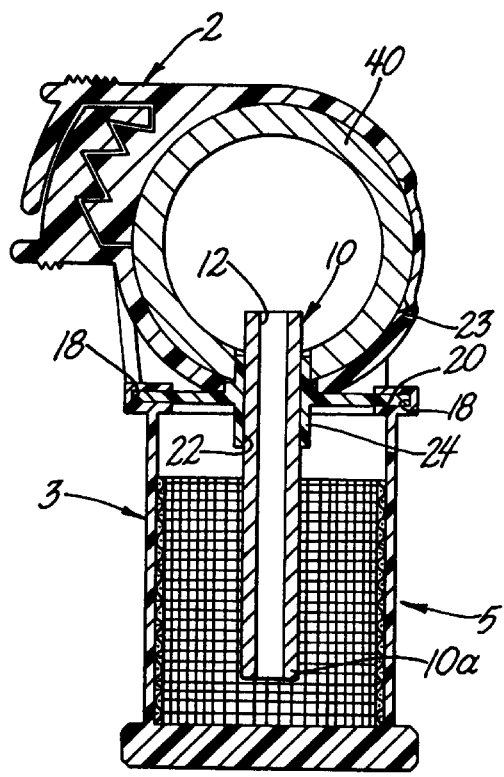
FIG. 3 is a cross-sectional view of an oil filter unit detailing the pick-up tube connected to an aperture of a conduit in an accumulator filter according to the present invention taken along line 3—3 of FIG. 1.
Figure 4:
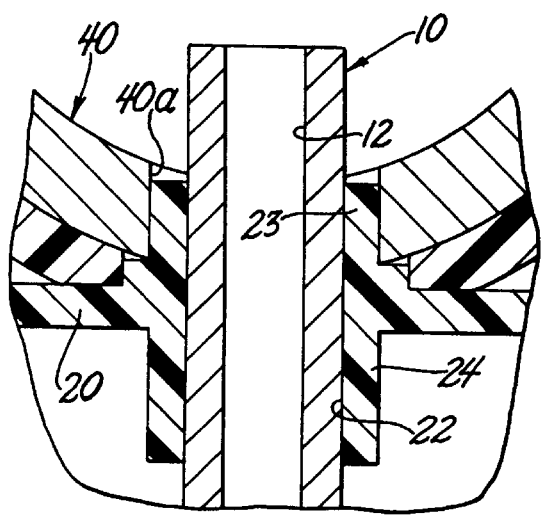
FIG. 4 is a close up view detailing the oil filter assembly according to the present invention.
Figure 5:
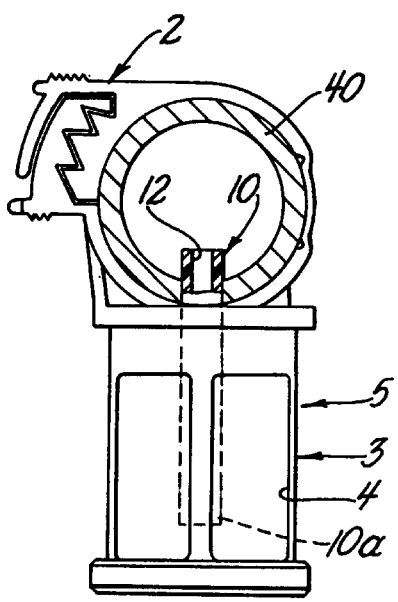
FIG. 5 is a partial cross-sectional view of an oil filter assembly according to the present invention.
Figure 6:
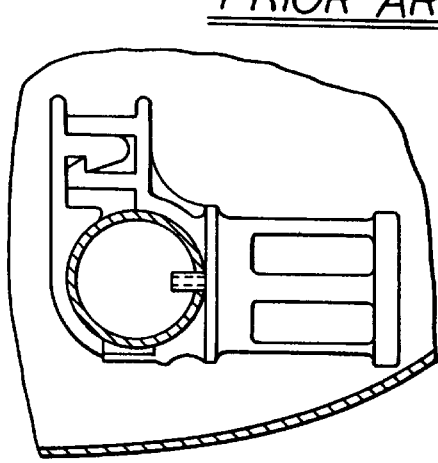
FIG. 6 is a view of a prior art conduit clamp assembly.

Referring particularly to FIGS. 3 and 5, each part of the oil filter unit 5 is shown in detail. The oil filter unit 5 has a generally cylindrical shape defined by the frame 3. The frame 3 has openings 4 covered by the mesh material 1 supported by the frame 3. The mesh material 1 is preferably made from nylon, but any other suitable material for filtering particles from the oil would be appropriate. The mesh size is chosen according to well known prior art methods.

The oil filter frame 3, as shown in FIG. 3, is attached to the "J" tube 40 by the clamp 2 as is well known in the art. The clamp 2 is preferably integral and unitary with the frame 3. The disk member 20 has extensions 23 and 24 extending in opposite directions from the disk member 20 located in a space 18 located between the frame 3 and the clamp 2. The disk member 20 includes the passage 22 concentrically aligned with the axis of the disk member and extending through the extensions 23 and 24 of the pick-up tube 10 which extends into the "J" tube 40 through the aperture 40a. Another portion of the pick-up tube 10 extends down into the oil filter 1.

The pick-up tube 10 is preferably manufactured as a rigid, straight tube made of a hard metal or alloy. The pick-up tube 10 prevents the extension 23 of the disk member 20 from being crushed or deformed during assembly and thereby substantially improves reliability and efficiency in the manufacturing and assembly of the accumulator dehydrator 6 when the extension 23 is inserted in the aperture 40a of the "J" tube 40.

In an alternative embodiment of the present invention, an end 10a of the pick-up tube 10 is extended further down into the oil filter unit 1 such that the oil filter unit is extended closer to the bottom of the accumulator dehydrator 6. Extending the end 10a into the bottom of the accumulator dehydrator 6 allows less oil to be used within the accumulator dehydrator 6 for lubricating the compressor 9. By reducing the amount of oil required for lubricating the air-conditioning system 30, an overall cost savings is realized.

Although the best mode contemplated by the inventor for carrying out the present invention as of the filing date hereof has been shown and described herein, it will be apparent to those skilled in the art that suitable modifications, variations and equivalents may be made without departing from the scope of the invention, such scope being limited solely by the terms of the following claims and the legal equivalents thereof.

What is claimed is:

1. An oil filter unit for attachment to an aperture in a conduit of an accumulator in an air-conditioning system, said oil filter unit comprising:

a thermoplastic frame having at least one peripherally disposed aperture and an open end;

a filter material covering said at least one peripherally disposed aperture for filtering particles from the oil;

a disk mounted within said thermoplastic frame, said disk having transverse extending portions having an opening therethrough; and a tube located in said opening of said transverse extending portions of said disk and extending into said defined thermoplastic frame at one end thereof and through said opening into said conduit at an opposite end thereof, whereby said tube when located in said opening of said transverse extending portions of said disk prevents collapsing of said transverse extending portions so as to ensure continuous communication of oil between said filter unit and said conduit of said accumulator.

2. An oil filter unit according to claim 1 wherein said tube consists of a metal material.

3. An oil filter unit according to claim 1 wherein said tube consists of an alloy.

4. An oil filter unit according to claim 1 wherein said tube consists of a thermoplastic material having a hardness higher than said material of said disk.

5. An oil filter unit according to claim 1 further comprising a conduit clamp for engaging an outer diameter of said apertured conduit for securing said oil filter unit to said conduit.

6. An oil filter unit as claimed in claim 5 wherein said oil filter unit is integrally joined to said conduit clamp.

7. An improved air-conditioning system of the type having an accumulator with a conduit having an aperture therein, an oil filter apparatus attached to said conduit surrounding said aperture, said oil filter apparatus including a filter unit, a conduit clamp joined with said filter unit and a disk member having transversely extended portions having an opening therethrough, one of said extended portions extending in a direction away from said disk member and into said aperture of said conduit, wherein the improvement comprises:

a rigid hollow tubular support member located in said opening of said extended portions of said disk member, and passing into said aperture of said conduit so as to provide support for said extended portions of said disk member thereby preventing collapsing of said extended portions, said rigid hollow tubular support member further having an internal passage for ensuring continuous communication of oil between said filter unit and said conduit.

* * * * *